2,780,655
Patented Feb. 5, 1957

2,780,655

RECOVERY OF PENTAERYTHRITOL BY FORMALIN EXTRACTION

Harold I. Yalowitz, Terre Haute, Ind., assignor to Commercial Solvents Corporation, Terre Haute, Ind., a corporation of Maryland No Drawing. Application May 5, 1954,
Serial No. 427,859

4 Claims. (Cl. 260—637)

My invention relates to an improved process for the recovery of pentaerythritol, and more particularly to the recovery of pentaterythritol remaining in the reaction liquor from the condensation of formaldehyde and acetaldehyde in the presence of an alkaline condensing agent after the major portion of the pentaerythritol product has been removed.

Processes currently used for the commercial synthesis of pentaerythritol comprise the condensation of aqueous formaldehyde with acetaldehyde in the presence of a condensing agent such as an alkali metal hydroxide or alkaline earth metal hydroxide, neutralization of the reaction liquor, and the removal of the main bulk of the desired product from the reaction liquor by concentration and crystallization. However, about 10 to 12% of the pentaerythritol present in the liquor, together with syrupy products and alkali metal or alkaline earth metal salts remain unseparated.

Various methods for recovering the remaining 10 to 12% of the desired pentaerythritol products from these reaction liquors have been proposed in the past. One such process involves the concentration of these liquors and fractional crystallization of the mixture to separate the alkali metal or alkaline earth metal salts from the pentaerythritol. Several concentration steps are necessary and generally only about four to five percent of the pentaerythritol produced, which is approximately only 40% of the pentaerythritol present in the depleted reaction liquor, is removed, together with 40 to 60% of the metal salts. The remaining liquor is very thick and syrupy, and it has heretofore been impractical to treat it further to obtain useful products, and accordingly it has generally been discarded.

Another process which has been used comprises the extraction of the pentaerythritol and the by-products by means of a water-soluble aliphatic alcohol. The water is then removed from the aqueous solution by azeotropic distillation and the anhydrous alcoholic solution remaining is cooled in order to crystallize the dissolved pentaerythritol and small amounts of alkali metal or alkaline earth metal salts.

Although these prior art methods for treating the depleted reaction liquors after the bulk of pentaerythritol has been recovered produced small yields of additional pentaerythritol, they have all involved the use of additional expensive reagents or many concentration and distillation steps in order to effect the small recovery realized. This has rendered the use of the processes economically unprofitable, and in practice the liquors remaining after the separation of the first crop of pentaerythritol crystals have usually been discarded as waste material.

I have now discovered a simple, economical process for recovering pentaerythritol remaining after concentrating and crystallizing the reaction products from the condensation of aqueous formaldehyde with acetaldehyde in the presence of an alkaline condensing agent. My new recovery process does not require any expensive reagents, and requires only a simple separation of solids in lieu of several filtrations, concentrations, and recrystallizations of the prior art. My new process consists essentially of concentrating the mildly alkaline reaction liquor from which the major portion of pentaerythritol has been removed to a slurry containing solid pentaerythritol and metal salts, adding such a quantity of formalin to the said slurry that substantially all the solid pentaerythritol dissolves, separating the undissolved metal salts from the resulting mixture, and recovering the pentaerythritol from the alkaline solutions separated.

The reaction liquor remaining from the first crop pentaerythritol crystallization is first concentrated at reduced pressure to a thick slurry. I prefer to carry this concentration to the point at which practically all of the pentaerythritol and metal salts have precipitated, since in this manner more of the undesired alkali metal or alkaline earth metal salts are separated in the subsequent steps.

A sufficient quantity of formalin is then added to the concentrated reaction liquor slurry so that upon mild heating and agitation substantially all of the solid pentaerythritol remaining in the alkaline slurry dissolves, leaving a major portion of the metal salts undissolved. I have generally found that an amount of formalin containing from about two to about ten moles of formaldehyde for each mole of pentaerythritol calculated to remain in the concentrated reaction liquor is sufficient for this purpose. When the solution separated from the undissolved metal salts is to be recovered by any procedure that does not include adding that solution to a reaction mixture for a subsequent batch before the condensation reaction takes place, I then deem it preferable to use the lower range of these ratios, i. e. from about two to about four moles of formaldehyde per mole of pentaerythritol remaining in the reaction liquor. This procedure avoids too great a concentration of formaldehyde which must be removed by distillation to secure optimum yields of crystallized pentaerythritol.

The term formalin when employed in this disclosure refers to the technical formalin of commerce, containing from about 30 to about 40% formaldehyde in aqueous solution. The degree of mild heat employed along with agitation to accelerate solution of the pentaerythritol is not critical, prolonged agitation alone being sufficient. However, I have found it time-saving to heat the concentrated reaction liquor-formalin mixture to not more than 100° C. to accelerate the solution of solid pentaerythritol.

When substantially all of the solid pentaerythritol present in the reaction liquor slurry has been dissolved the resulting mixture is then cooled to room temperature and the undissolved metal salts remaining therein separated. This separation may be carried out by any convenient procedure such as filtration, centrifugation, decantation, etc.

That part of the pentaerythritol not recovered in the first crystallization after the condensation reaction of formaldehyde and acetaldehyde can now be easily recovered from the mildly alkaline aqueous formaldehyde solution because it has been separated from the undissolved metal salts. Any convenient means may be used for the recovery of this pentaerythritol. However, I prefer to recover this portion of the pentaerythritol by adding the mildly alkaline solution containing it to a subsequent pentaerythritol preparation for recovery as a part of the first crystal crop from that preparation. This may be accomplished by either of two procedures.

The mildly alkaline solution separated from the undissolved metal salts can be employed as a part of the reaction mixture for the subsequent preparation of pentaerythritol and the portion of the pentaerythritol added by this means recovered as a part of the first crop of crystals from the subsequent preparation. In following this procedure the formaldehyde added to effect solution of the pentaerythritol in the reaction liquor slurry is considered as a part of the reactant formaldehyde for the subsequent condensation. That is, the moles of formaldehyde added to the slurry are subtracted from the moles of reactant formaldehyde to be charged to the subsequent preparation. The condensation reaction is carried out under strongly alkaline conditions, i. e. from a pH of about 11 to about 12.5. Thus the pentaerythritol present in the mildly alkaline separated solution will be present in the strongly alkaline reaction mixture as free pentaerythritol to be precipitated along with crop one from the subsequent reaction liquors.

I have also found that I can add the mildly alkaline aqueous solution containing formaldehyde and pentaerythritol to the reaction liquor which is a product of a subsequent pentaerythritol prepration to be concentrated and precipitated along with the pentaerythritol present in the subsequent reaction liquor. Since the reaction liquor from the subsequent preparation is strongly alkaline, i. e. pH from about 11 to about 12.5, the pentaerythritol present in the mildly alkaline solution added will again be in the form of free pentaerythritol for precipitation as a part of crop one from the subsequent separation.

Another convenient method for the recovery of the pentaerythritol content from the separated mildly alkaline aqueous solution consists of a distillation at atmospheric or increased pressures to remove substantially all of the formaldehyde present, concentration of the formaldehyde-free solution, and cooling to crystallize an additional crop of pentaerythritol. The most economical method for employing this procedure is to form a composite mixture of several of the separate mildly alkaline solutions separated and recover their pentaerythritol content at one time.

When employing this separate and direct recovery for the pentaerythritol content of the separated solutions I prefer to subject the solutions to a treating step under relatively acid or relatively strongly alkaline conditions before distilling to remove the formaldehyde present. This acid or alkaline treating step is incorporated to insure the dissociation of any complex formed between pentaerythritol and formaldehyde present in the solution, and the liberation of pentaerythritol and formaldehyde in their free forms. Because of the strongly alkaline conditions in subsequent mixtures or reaction liquors from pentaerythritol preparations it is not necessary to include the acid or alkali treating step when the mildly alkaline solution is to be added to a subsequent preparation batch. However, the acid or alkali treating step may be employed even when the pentaerythritol content of the separated solution is to be recovered as a part of the first crop from a subsequent preparation, in order to insure that all of the pentaerythritol present in the separated solution is in its free form before concentration and precipitation.

The following specific examples will more fully illustrate the manner of carrying out my invention:

*Example I*

In this example a series of runs were conducted wherein the depleted reaction liquor from each crop of pentaerythritol was separated from a substantial part of the sodium salts produced and added to the succeeding condensation reaction as a part of the formalin charged. No mother liquor from another condensation was added to the first reaction of the series.

A mixture consisting of 312 ml. of a formalin solution, containing 34.6 grams formaldehyde per 100 ml., 453 ml. of water, and 35.4 grams of 95% sodium hydroxide pellets was prepared. There was then added 62.6 grams of a 42.2% by weight acetaldehyde solution by sub-surface addition over a period of 45 minutes with the reaction temperature held by means of a water bath between about 20° and 25° C. The reaction liquor was then agitated for an additional 6 hours at which time the pH of the liquor was 11.5. The pH of the liquor was adjusted to 7.8 by the addition of concentrated formic acid and the mildly alkaline liquor concentrated at atmospheric pressure to a specific gravity of 1.28 at 45° C. and allowed to stand at room temperature about 16 hours. The crystalline pentaerythritol formed in the reaction liquor after standing was separated by centrifuging, washed, and dried at 100° C. A yield of 59 grams of pentaerythritol representing a yield of 72.4% on the basis of acetaldehyde charged was obtained. The mother liquor and the wash water from the pentaerythritol were concentrated to a thick slurry, and then 104 ml. of a formalin solution containing 34.6 grams formaldehyde per 100 mls. was added and refluxed for 30 minutes. The resulting mixture was filtered through sintered glass. An 18 ml.-portion of concentrated hydrochloric acid was added to the resulting filtrate and the mixture refluxed for 3 hours. The acid treated mother liquor was then diluted with 430 ml. of water and was adjusted to a pH of 7.9 with 4% sodium hydroxide solution.

To the slightly alkaline mother liquor from the first condensation there was added a solution of 35.4 grams of sodium hydroxide pellets in 33.6 ml. of water and 208 ml. of the 34.6 grams per 100 ml. formalin solution. The mixture was cooled to 20° C. and 62.6 grams of a 42.2% by weight acetaldehyde solution added by sub-surface addition over a period of 45 minutes. The same procedure as outlined above for recovery of a first crop of pentaerythritol was conducted which resulted in a yield of 57.6 grams of dried pentaerythritol representing a 70.7% yield on the basis of acetaldehyde charged. The mother liquor was again treated in the same manner as before, yielding 30.6 grams of dried sodium formate, and was then added with the same amounts of additional reactants as stated above to a third condensation reaction. This reaction was conducted in the same manner for the same period of time and resulted in a yield of 61.8 grams dried pentaerythritol which represented a 75.8% yield on the basis of acetaldehyde charged. Filtration of the formalin-mother liquor solution during this procedure resulted in 101.6 grams of dried sodium formate.

The alkaline mother liquor and wash water solution from the above crystallization was again added to the same amounts of additional reactants by the same procedure as set forth above. The condensation reaction was conducted in the same manner and resulted in a yield of 64.5 grams of dried pentaerythritol representing a yield of 79.3% on the basis of acetaldehyde charged. The steadily increasing yields of pentaerythritol after each crystallization set out in the above series of condensation reactions indicate the increasing recovery of additional pentaerythritol recycled from mother liquors of previous crystallizations by the use of my process.

*Example II*

In this example laboratory-prepared simulated reaction liquors derived from already isolated pentaerythritol were recovered after the addition of treated mother liquors from previous crystallizations to demonstrate recovery of the pentaerythritol content of such mother liquors by addition after the subsequent condensation reaction has been completed. A simulated mother liquor was prepared in the laboratory consisting of 27 grams of pentaerythritol of an average purity of 92%, 95.2 grams of sodium formate, and 250 ml. of water. The liquor was heated to secure solution of all ingredients and then concentrated under vacuum to a thick slurry. To the resulting slurry there was added 52 ml. of a formalin solution containing 34.6 grams formaldehyde per 100 ml. and 1 gram of 95% sodium hydroxide. The resulting mixture was heated to reflux, then concentrated under vacuum until the solution contained large quantities of crystalline sodium formate which was thereupon separated by filtration and dried at 100° C. The resulting filtrate was diluted with 200 ml. of water, 10 ml. of concentrated hydrochloric acid was added, and the mixture refluxed for 2 hours and then cooled. The acid treated solution was then adjusted to a pH of 7.2 with 40% sodium hydroxide solution and was thereafter added to a simulated reaction liquor. A 38.1-gram portion of dried sodium formate was separated on the filtration described above.

The mildly alkaline simulated mother liquor was added to a simulated reaction liquor consisting of 122 grams of pentaerythritol of approximately 92% purity, 95.2 grams of sodium formate, and 500 ml. of water. The resulting mixture was heated and agitated until solution was secured. The solution was thereafter concentrated at atmospheric pressure to the specific gravity of 1.280 at 45° C. and was allowed to stand for about 16 hours to crystallize. The crystalline pentaerythritol formed was then separated by centrifuging, washed, and dried at 100° C. A yield of 120.5 grams of dry pentaerythritol crystals with a purity of 94.5% was secured. This represents a 101.5% yield of pure pentaerythritol on the basis of 122 grams of 92.0% pure pentaerythritol making up the simulated reaction liquor. It is obvious that a portion of the 27 grams of pentaerythritol making up the simulated mother liquor was recovered in this crop of crystals.

*Example III*

In this example a series of pentaerythritol condensation reactions were recovered which incorporated the separated mother liquor from the next preceding reaction after the completion of the condensation of pentaerythritol but prior to concentration to secure the crystalline product. The steadily increasing percentage yield throughout the series clearly indicates the increased recovery resulting from the addition of mother liquors from previous batches.

To initiate the series a mixture was prepared including 447 ml. of water, 315 ml. of a formalin solution containing 34.3 grams formaldehyde per 100 ml., and 35.4 grams of 95% sodium hydroxide crystals in 33.6 ml. of water. There was thereupon added by sub-surface addition 64.4 grams of a 41% by weight solution of acetaldehyde over a 45 minute period, keeping the reaction temperature between 20 and 25° C. Upon completion of the addition the reaction mixture was agitated for an additional 5 hours after which the pH of 11.6 was adjusted to a pH of 7.69. The reaction mixture was concentrated at atmospheric pressure to a specific gravity of 1.280 at 45° and allowed to stand at room temperature for approximately 16 hours. The pentaerythritol which had formed was separated by centrifuging, washed, and dried at 100° C.

The yield of dried pentaerythritol from the condensation reaction with no additional pentaerythritol added was 55.3 grams representing a 67.8% yield on the basis of the acetaldehyde charged.

The mother liquor and wash waters from the above crystallization were combined, concentrated to a thick slurry and treated with 50 ml. of the 34.3 grams/100 ml. formalin solution. The mixture was refluxed for 15 minutes and allowed to cool. The sodium formate crystals were filtered from the cooled solution and dried. To the filtrate was added 10 ml. of concentrated hydrochloric acid and the mixture refluxed for 2 hours. The pH of the cooled mixture was adjusted to 7.78 with aqueous sodium hydroxide. The amount of dried sodium formate recovered was 6.25 grams.

The hydrolyzed and neutralized solution of mother liquor and wash water from the above crystallization was added to a subsequent reaction mixture produced from the same amount of the same reactants by the same procedures outlined above, after that reaction mixture had been adjusted to a pH of 7.72. The combined reaction liquor and mother liquor were concentrated at atmospheric pressure to a specific gravity of 1.280, at 45° C., 335 ml. of water was added to the concentrate, and the diluted solution was again concentrated to a specific gravity of 1.280 at 45° C. The crystalline pentaerythritol was recovered in the same manner as outlined above to a yield of 64 grams representing a percentage yield of 78.4% of theoretical based on the amount of acetaldehyde charged. The mother liquor from this crystallization was again treated with 50 ml. of formalin solution by the same procedure as before and was again added to a third condensation reaction product after adjustment of the pH of that product. A 49.7-gram portion of sodium formate was separated from the mother liquor from the above crystallization.

The combined third condensation reaction product and mother liquor from the second crystallization was treated by the same procedure as outlined above to yield 64.4 grams of dried pentaerythritol representing a 78.9% theoretical yield based on acetaldehyde charged. The resulting combined mother liquor and wash waters from the above crystallization were treated with 35 ml. of formalin solution by the same procedure as set forth. This alkaline mother liquor solution was then added to a fourth condensation reaction product produced from the same amounts of reactants and by the same procedure as set forth after adjustment of the pH of the reaction product. The combined reaction product and mother liquor were again treated by the same procedure as set forth and resulted in a yield of 68.9 grams of dried pentaerythritol representing a percentage yield of 84.4% based on the acetaldehyde charged.

It is obvious from the yields secured in the above example that recovery of additional quantities of pentaerythritol from mother liquors resulting from precipitation of the first crop of pentaerythritol may be achieved by use of my new process when a separated reaction liquor solution is added to a subsequent condensation reaction product for concentration and recovery.

When, as in the present example, the reaction liquor solution is added after adjustment of the pH of the subsequent reaction product to only mildly alkaline, I prefer to treat the separated reaction liquor solution with acid or alakali to insure that all the pentaerythritol present is in the free form.

I have set forth herein both preferred and alternative methods for the recovery of the pentaerythritol present in the aqueous solution separated from metal salts by my process. Other methods for recovery of this pentaerythritol will occur to those skilled in the art, but it is my intent to embrace the use of my procedure combined with any suitable method of recovery which may be employed.

Now having described my invention what I claim is:

1. An improved process for the recovery of pentaerythritol from a mildly alkaline reaction liquor from which the major portion of pentaerythritol has been removed which comprises concentrating the said reaction liquor to a slurry containing solid pentaerythritol and metal salts, adding such a quantity of formalin to the said slurry that substantially all the solid pentaerythritol dissolves, separating the undissolved metal salts from the resulting mixture, and recovering the pentaerythritol from the alkaline solution separated.

2. An improved process for the recovery of pentaerythritol from a mildly alkaline reaction liquor from which the major portion of pentaerythritol has been removed which comprises concentrating the said reaction liquor to a slurry containing solid pentaerythritol and metal salts, adding such a quantity of formalin to the said slurry that substantially all the solid pentaerythritol dissolves, separating the undissolved metal salts in the resulting mixture, diluting the separated alkaline solution, removing formaldehyde from the diluted solution by distillation, concentrating the formaldehyde-free solution to a high solids content, allowing the solution to cool, and recovering the precipitated pentaerythritol therefrom.

3. An improved process for the recovery of pentaerythritol from a mildly alkaline reaction liquor from which the major portion of pentaerythritol has been removed which comprises concentrating the said reaction liquor to a slurry containing solid pentaerythritol and metal salts, adding such a quantity of formalin to the said slurry that substantially all the solid pentaerythritol dissolves, separating the undissolved metal salts in the resulting mixture, adding the separated alkaline solution to another batch of reactants as they are prepared, and recovering the additional pentaerythritol thus added as a part of the first crop of crystals from the subsequent batch.

4. An improved process for the recovery of pentaerythritol from a mildly alkaline reaction liquor from which the major portion of the pentaerythritol has been removed which comprises concentrating the said reaction liquor to a slurry containing solid pentaerythritol and metal salts, adding such a quantity of formalin to the said slurry that substantially all the solid pentaerythritol dissolves, separating the undissolved metal salts in the resulting mixture, adding the separated alkaline solution to another batch of reaction product after the reaction has been completed, and recovering the additional pentaerythritol thus added as a part of the first crop of crystals from the subsequent batch.

References Cited in the file of this patent

UNITED STATES PATENTS

| | | |
|---|---|---|
| 2,223,421 | Hubacher et al. | Dec. 3, 1940 |
| 2,612,526 | Gould | Sept. 30, 1952 |